Sept. 16, 1941.   E. F. HOGAN   2,256,088
FISH LURE
Filed Sept. 1, 1938
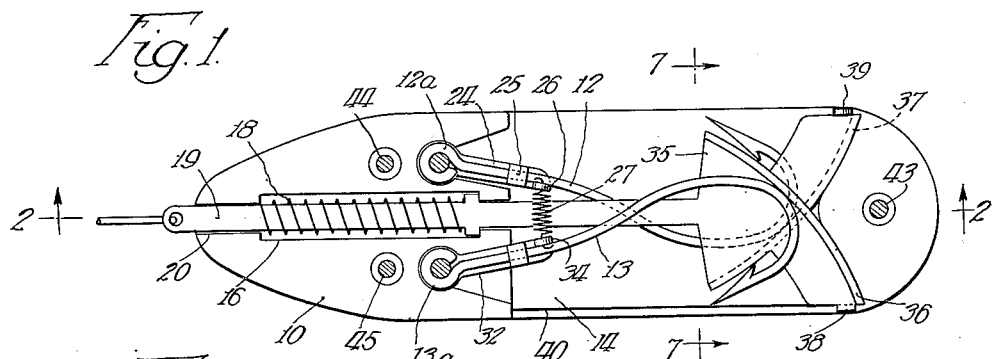
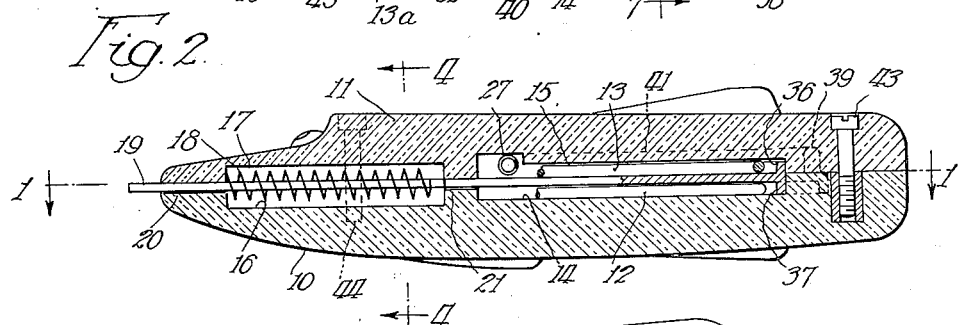
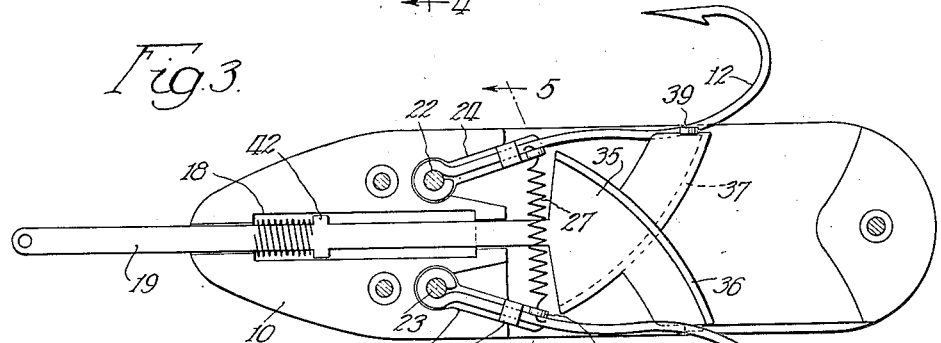
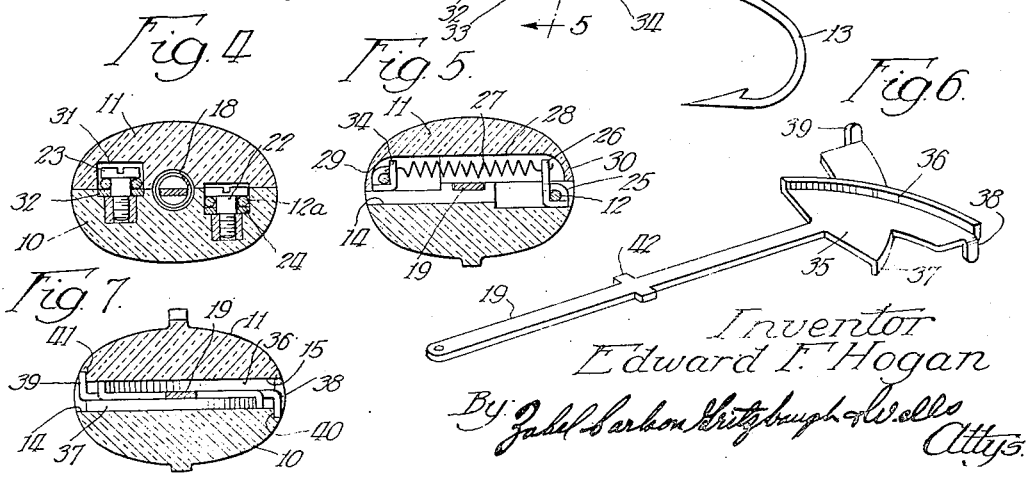
Inventor
Edward F. Hogan Patented Sept. 16, 1941

2,256,088

UNITED STATES PATENT OFFICE 2,256,088

FISH LURE

Edward F. Hogan, Chicago, Ill.

Application September 1, 1938, Serial No. 227,936

3 Claims. (Cl. 43—36)

The present invention relates to lures or baits for fishing. It is particularly adaptable to lures that are used for casting, and has as its principal object the provision of a lure which is essentially free of any projections that will cause it to become entangled in weed beds or brush.

The present invention contemplates the provision of a lure of this character wherein the hook or hooks will be normally held in concealed or retracted position so that they will not project and become entangled, even though the lure strikes the water or weeds or brush with considerable force. The lure embodying the present invention comprises, with the features just mentioned, means for projecting the hook or hooks beyond the body of the lure at the instant a pulling force is applied between the line and the body of the lure. This pulling force must exceea a certain minimum amount in order to cause the hooks to project. The arrangement is such, however, that if a fish strikes the lure and thus exerts a sudden pull, or the fisherman jerks the lure when it is held by a fish, the hooks will be immediately projected. Once projected, the hooks are backed up by a solid backing so that they will not readily collapse again into the body of the lure.

The features and advantages of the invention will appear more fully as the description proceeds, reference being had to the accompanying drawing wherein a preferred form of the invention is shown. It is to be understood, however, that the drawing and description are illustrative only and are not to be taken as limiting the invention except insofar as it is limited by the claims.

In the drawing, Fig. 1 is a plan sectional view taken on the line 1—1 of Fig. 2 and illustrates a lure embodying the invention;

Fig. 2 is a sectional view on the line 2—2 of Fig. 1;

Fig. 3 is a sectional view on the line 1—1 of Fig. 2, but illustrating the parts in a changed position;

Fig. 4 is a sectional view on the line 4—4 of Fig. 2;

Fig. 5 is a sectional view on the line 5—5 of Fig. 3;

Fig. 6 is a perspective view of the combined cam and line attaching element, and Fig. 7 is a sectional view substantially on the line 7—7 of Fig. 1 illustrating the guides on the lure body for the cam element.

Referring now to the drawing, the present invention is embodied in a lure, the body of which consists of a base 10 and a cover 11. The construction preferably is such that the operative parts of the lure are substantially all mounted upon the base 10, and the cover 11 is adapted to be applied after the operating parts are assembled upon the base. The material of which the base 10 and the cover 11 is constructed may be any suitable material, such, for example, as molded compositions, wood, or various metals and alloys. The shape of the body of the lure may, of course, be varied to imitate various types of natural or live bait, such, for example, as minnows, frogs, etc.

The present invention concerns itself primarily with the provision of means whereby one or more hooks such as those shown at 12 and 13 may be mounted in the body of the lure so that normally they are concealed within a recess or recesses of the body, ready to be projected whenever a fish strikes the lure. The base 10 is cut out intermediate its ends to provide a shallow, transversely extending recess 14, and the cover 11 is also recessed as indicated at 15 to provide space in which the hooks 12 and 13 may be concealed. Forwardly of the recess 14, the base 10 is provided with a smaller recess 16 which is directly opposite a recess 17 in the cover 11. The purpose of the recesses 16 and 17 is to provide a space for a spring 18 which is coiled around a combined line attaching and cam element 19. The base 10 is grooved at 20 and 21 to provide guides for the element 19, which is movable endwise with respect to the body of the lure.

The hooks 12 and 13 are pivotally mounted on the base 10 by means of screws 22 and 23. It will be noted that the screw 22 is set down into the base 10 so that the top thereof comes substantially at the level of the junction between the base 10 and the cover 11. The base 10 is recessed to permit setting the screw 22 in this lower position so that the hook 12 will lie fairly close to the bottom of the recess 14. The hook 12 is attached to the screw 22 by the eye 12a of the hook. An arm 24 is also pivoted on the screw 22 and is fastened to the shank of the hook 12 by a finger 25 which is formed integral with the arm 24 and bent over the hook as shown clearly in Figs. 1, 3 and 5. The arm 24 also has an ear 26 projecting upwardly from it to which a spring 27 is attached. The spring 27 is under tension which tends to pull the hook 12 into the body of the lure to the position shown in Fig. 1.

The cover 11 is provided with a recess 28 directly over the spring 27 so as to provide space for the spring above the member 19. The opposite ends of the recess 28 are closed by integral parts 29 and 30 of the cover 11 (see Fig. 5). The parts 29 and 30 act to a degree as limiting stops to limit the throw of the hooks 12 and 13 outwardly.

The hook 13 is mounted on the screw 23, the screw 23 being projected above the base 10. The cover 11 is recessed, as shown at 31, to receive the head of the screw 23. The hook 13 has its eye 13a pivoted on the screw 23. Also pivoted on the screw 23 is an arm 32 which is similar to the arm 24. The arm 32 has a finger 33 thereon which is bent over the shank of the hook 13. The arm 32 has also an ear 34 to which the spring 27 is attached. Owing to the relative positions of the screws 22 and 23, the planes of movement of the hooks 12 and 13 are separated. It will be noted that the ear 26 is longer than the ear 34 so as to hold the spring 27 above the member 19.

The member 19 is so constructed as to maintain separation of the hooks 12 and 13. For this purpose it is provided with a cam body portion 35 which is interposed between the barbed ends of the hooks 12 and 13. The cam body portion 35 has a top camming surface 36 which is engaged by the hook 13, and a bottom camming surface 37 which is engaged by the hook 12. These camming surfaces engage the back curved parts of the hooks and are utilized to force the hooks outward into active, or projecting, position. The operation of the hooks and the camming surfaces will be more fully described hereinafter. The body portion 35 is provided at its rear-most end with a downturned guide lug 38 at one side edge and an upturned guide lug 39 at the other side edge. These guide lugs, as shown best in Fig. 7, ride in corresponding grooves 40 and 41 which are formed in the base 10 and the cover 11, respectively, so that the lugs 38 and 39 do not project beyond the outline of the body of the lure.

It should be noted that all of the hook operating mechanism is completely within the outline of the body of the lure, the only projection being the front end of the line attaching and cam member 19. The recesses 14 and 15 of course open to the opposite sides of the lure so that the hooks 12 and 13 may project. However, when the hooks are retracted the exterior of the lure is free of any projections which would entangle it in the weeds, rocks or brush.

Referring now to the element 19 and its operation in projecting the hooks 12 and 13, it will be noted that this element has a shoulder at 42 forming a stop for the one end of the spring 18. The spring 18 is under compression between the shoulder 42 and the forward ends of the recesses 16 and 17. Thus the force of this spring tends to hold the element 19 in the position shown in Fig. 1, where the cam surfaces 36 and 37 are so far back that the hooks 12 and 13 are free to recede into the body of the lure. The spring 27 will of course insure their being drawn into the body of the lure because it is under tension.

The cam surfaces 36 and 37 are so shaped with respect to the curved backs of the hooks 12 and 13 that it requires a certain substantial minimum pull on the member 19 to overcome the force of the spring 18 and the friction of the hooks 12 and 13 so as to start the member 19 forwardly with respect to the body of the lure. This pulling force may be regulated to a nicety by the correlation of the several parts which affect it, namely, the strength of the spring 18, the compression it is under, the strength of the spring 27, the tension it is under, and the shapes of the contacting surfaces of the cams 36 and 37 and the hooks. It is understood, of course, that the materials used are desirably such that rust and corrosion will have a minimum effect upon the continued operation of the parts.

It will be evident, from an inspection of Figs. 1 and 3, that as the hooks move outwardly the curved back edges thereof soon reach the outer ends of the cam surfaces 36 and 37, whereupon the pull necessary to move the parts into the position shown in Fig. 3, depends upon the curvature of the backs of the hooks and the force of the springs 18 and 27, and not upon the shape of the cam surfaces 36 and 37. It is evident that with a minor amount of force the hooks will be held in the projected position shown in Fig. 3, once they have reached that position.

From the standpoint of desirable operation, it may be necessary with certain types of lures to vary the shapes of the cam surfaces 36 and 37 and the relative strength of the springs 18 and 27. As a desirable feature for most purposes, however, these parts are so arranged that the pulling force between the line attaching element 19 and the body of the lure necessary to project the hooks is practically as great at the beginning of the hook movement as it is at any point in the travel of the hooks outward.

Therefore, any pull by a fish striking that would move the hooks out at all would normally project the hooks to their fully active position, as shown in Fig. 3.

From the above description, it is believed to be clear that I have provided a lure of the weedless type wherein the hooks remain concealed or retracted throughout all normal casting and reeling in. The hooks are projectible only upon the application of a certain minimum pulling force between the line and the lure, and this pulling force may be applied either by a fish striking or by the pull of the fisherman against a fish which is merely holding the lure in its mouth. If there is a strike and a miss the hooks will again be retracted so that the lure will not become snagged in reeling in after a missed strike. The slap of the lure against the water, or against a solid object will not cause the hooks to project. This is not a trigger lure where the hooks are released by actuation of a trigger mechanism.

As hereinabove stated, the shape and decoration of the base 10 and cover 11 may be varied in any desirable way. The cover 11 may be readily removed since it is attached to the base 10 by three screws 43, 44 and 45, there being one screw at the back of the lure and two screws adjacent the front in the opposite sides of the member 19. The mechanical details of the working parts of the lure may be varied within the scope of the invention, as will be readily understood. As shown, the hooks 12 and 13 may be readily replaced by similar hooks, in the event they are broken by detaching them from the arms 24 and 32. Similarly, the other parts of the lure, including the springs 18 and 27, may also be readily replaced when the cover 11 is removed.

Having thus described my invention, what I claim as new and desire to secure by Letters Patent is:

1. In a lure of the character described, a lure body, two hooks movably mounted thereon and lying one over the other in overlapping relation, a cam member separating said hooks, and oppositely directed cam portions on said member for engaging the hooks, said cam member being movable lengthwise of the body to project the hook points and barbs from the body, and resilient means urging said hooks into overlapping relation, oppositely disposed guide tracks on said body, and projections on said cam member and riding on said guide tracks.

2. In a lure of the character described, a lure body, a hook pivotally mounted thereon, a cam member engaging said hook, said cam member being movable lengthwise of the body to project the hook point and barb from the body, resilient means urging said hook into said body, guide tracks on said body, and projections on said member and riding on said guide tracks.

3. In a lure of the character described, a lure body, a hook pivotally mounted thereon, a cam member engaging said hook, said cam member being movable lengthwise of the body to project the hook point and barb from the body, resilient means urging said hook into said body, guide tracks on said body, and projections on said member and riding on said guide tracks, said guide tracks being wholly within the peripheral outline of said body.

EDWARD F. HOGAN.